(No Model.) 2 Sheets—Sheet 2.
E. NORTON & J. G. HODGSON.
DOUBLE SEAMING MACHINE.
No. 378,143. Patented Feb. 21, 1888.
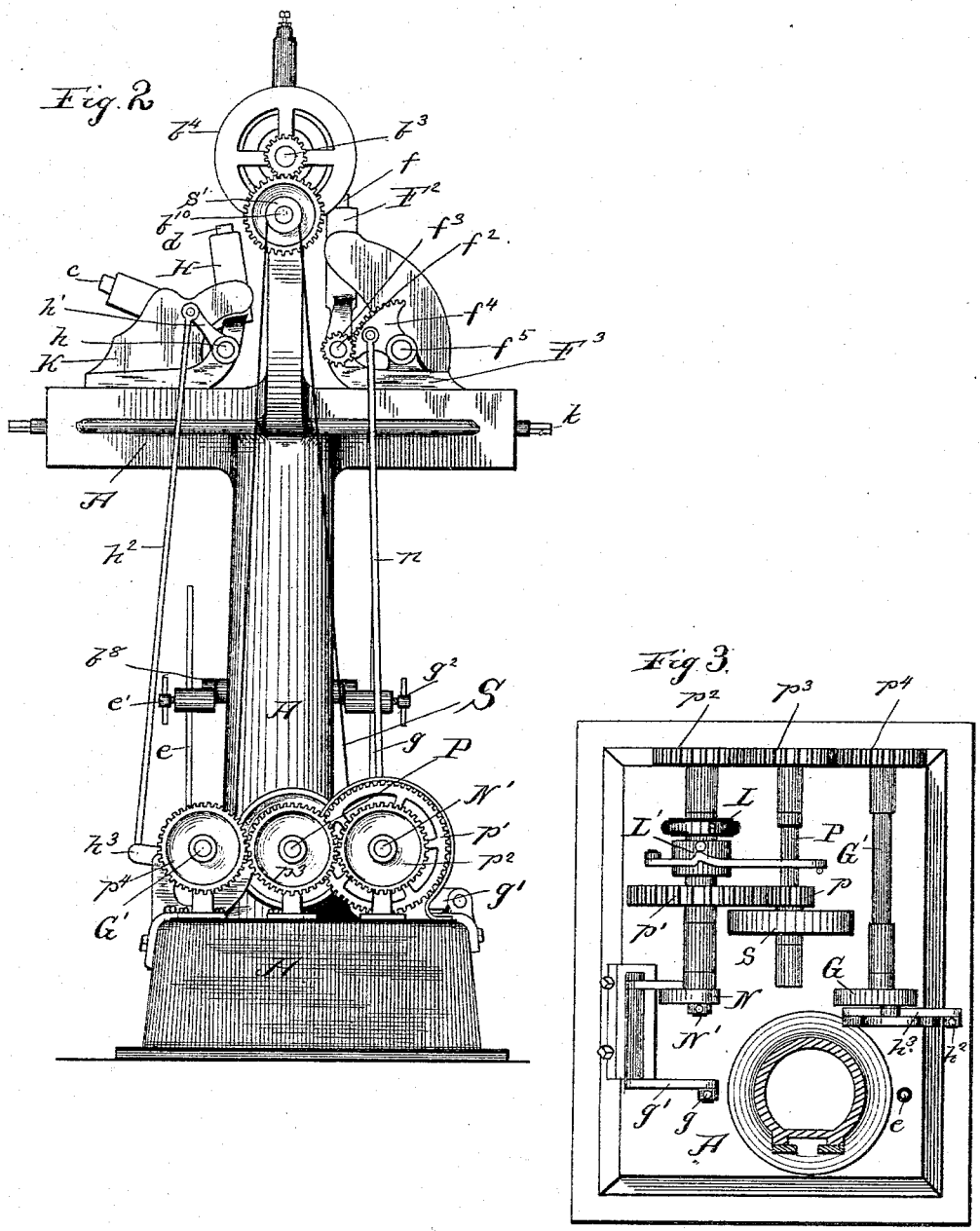

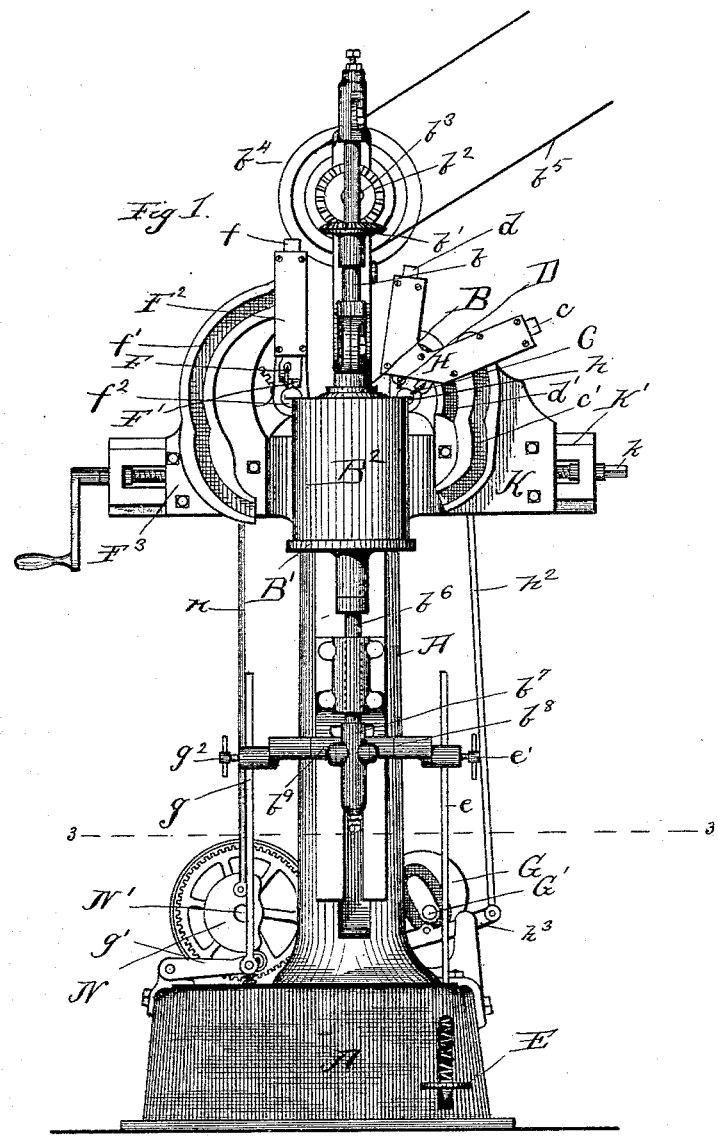

UNITED STATES PATENT OFFICE.

EDWIN NORTON AND JOHN G. HODGSON, OF MAYWOOD, ASSIGNORS TO SAID EDWIN NORTON AND OLIVER W. NORTON, OF CHICAGO, ILLINOIS.

DOUBLE-SEAMING MACHINE.

SPECIFICATION forming part of Letters Patent No. 378,143, dated February 21, 1888.

Application filed June 23, 1887. Serial No. 242,276. (No model.)

*To all whom it may concern:*

Be it known that we, EDWIN NORTON and JOHN G. HODGSON, citizens of the United States, residing in Maywood, in the county of Cook and State of Illinois, have invented a new and useful Improvement in Double-Seaming Machines, of which the following is a specification.

Our invention relates to machines for seaming the heads upon sheet-metal cans, and more particularly to improvements upon the machines heretofore patented to us in Letters Patent Nos. 272,972, of February 27, 1883, and 300,002, of June 10, 1884.

In double-seaming heads upon flangeless can-bodies we find it to be a material improvement to combine with the double tool of our later patent, which operates to fold or turn the flange over the vertical edge wall of the can-body, and then to turn or fold downward such flange, together with the wall of the can-body embraced thereby, the two tools of our former patent, and suitable cams and mechanism for operating such tools, as thereby the double seams may be formed with greater facility, as well as with greater certainty and perfection. By this means, also, the same machine is adapted to operate upon either flanged or unflanged can-bodies, which is often a matter of great convenience to the user of the machine.

Our invention consists in the novel devices and novel combinations of parts or devices herein shown and described, and more particularly set forth in the claims.

In the accompanying drawings, which form a part of this specification, and in which similar letters of reference indicate like parts, Fig. 1 is a front elevation of a machine embodying our invention. Fig. 2 is a rear elevation. Fig. 3 is a section on line 3 3 of Fig. 1.

In said drawings, A represents the frame of the machine; B and B', the revolving chuck, by which the can $B^2$ is held and rotated while its head is being seamed to its body by the seaming-tools C D and F F'.

The upper and non-reciprocating disk, B, of the chuck is secured on the end of a vertical shaft, $b$, mounted in suitable bearings on the frame of the machine, and is driven by a bevel-gear, $b'$, thereon, which meshes with a bevel-gear, $b^2$, on the horizontal driving-shaft $b^3$. The shaft $b^3$ has a driving-pulley, $b^4$, operated by a belt, $b^5$.

The lower and vertically-reciprocating disk, B', of the chuck is mounted in the end of a shaft, $b^6$, which slides up and down in suitable bearings on the frame of the machine. The shaft $b^6$ rests in a suitable socket, $b^7$, on one arm of the crank-shaft $b^8$. The crank-shaft $b^8$ is journaled at $b^9$ on the frame of the machine, and is connected by a rod, $e$, with a treadle, E, by which it may be rocked, and the disk B' raised or lowered to clutch or release the can. The crank-shaft $b^8$ is also connected, by a link or rod, $g$, with the cam-lever $g'$ and the cam N, through which the chuck-disk B' is operated automatically. The rods $e$ and $g$ are both connected with the arms of the crank-shaft adjustably by set-screws $e'$ $g^2$, to adapt the machine for cans of different lengths. By simply loosening the set-screw $g^2$, the chuck may be operated wholly by the treadle E. This chuck-operating mechanism is substantially the same as in our Patent No. 300,002, before referred to, to which reference is made for a more full description.

The tools C and D are journaled on separate or independent slides $c$ and $d$, which are reciprocated radially in and out on a rocking tool-holder, H, by means of stationary cams $c'$ $d'$, cut in the side face of the adjustable cam block or slide K. The rocking tool-holder H has a pivot or rock-shaft, $h$, journaled on the slide K, and the arm $h'$ of this rock-shaft $h$ is connected, by a suitable link or rod, $h^2$, and lever $h^3$, with the cam-disk G, by which the tool-holder is operated automatically. The cam-slide K is adjusted in and out its slideway K' on the frame by the adjusting-screw $k$.

The double tool F F', consisting of two tools journaled at right angles to each other, as shown, is mounted upon a slide, $f$, which is reciprocated radially in and out on the rocking tool-holder $F^2$ by means of the stationary cam $f'$, cut in the slide $F^3$. The rock-shaft $f^2$ of the tool-holder $F^2$ is journaled on the slide $F^3$, and is furnished with gear $f^3$ on its end, which meshes with a segment, $f^4$, by which it is operated. The segment-gear $f^4$ is journaled at $f^5$ on the slide $F^3$, and is operated from the cam-disk N by connecting-rod $n$.

The cam-shaft N' is driven from the counter-shaft P through the gears $p$ and $p'$, and the cam-shaft G' is driven from the shaft N' through the intermeshing gears $p^2$ $p^3$ $p^4$, the gear $p^3$ being loose on the shaft P.

L represents a friction-brake, and L' the clutch mechanism. These devices are both of a well-known form, and need not here be shown or described in detail, as they are fully described in our said Patent No. 300,002.

The counter-shaft P is provided with a pulley, $s$, driven by a belt, S, from a pulley, $s'$, on the shaft $b^{10}$.

In operation a countersunk can-head having a horizontally-projecting flange is placed upon a flangeless can-body in the revolving chuck of the machine. The double tool F F' then descends and first folds the horizontal flange of the can-head down over the vertical wall of the can-body; and then as the tool-holder F² swings down or around on its axis the tool F F' turns or folds down into a horizontal position, the three thicknesses of tin (the vertical wall of the countersunk head, its folded flange, and the vertical wall of the can-head embraced between) constituting the partially-formed seam. When the tool-holder F² swings down a little below the horizontal position, the cam $f''$ withdraws the tool F F' from the can, and at the same time the tools B and C are advanced by their cams into operative position, the under tool, C, supporting the outwardly-projecting and partially-formed seam, while the upper tool, B, presses, rolls, or folds the seam down snugly against the vertical wall of the can-body as the two tools swing down through the lower portion of their arc. With flanged can-bodies the operation will be the same, excepting that part of the work of the double tool F F' is of course done before the flanged can-body is placed in the machine; or, if desired, the double tool F F' may be disconnected, and the tools B C will then perform the whole work of forming the seam.

We claim—

1. In a can-seaming machine, the combination of a double-seaming tool, F F', mounted on a rocking and radially-reciprocating slide, $f$, with tools C and D, mounted on rocking and radially-reciprocating slides $c$ $d$, substantially as specified.

2. The combination, with a revolving chuck or can-holder, B B', of seaming-tools C D and double-seaming tool F F', reciprocating slides $c$, $d$, and $f$, upon which said tools are journaled, rocking tool-holders H and F², carrying said slides $c$, $d$, and $f$, and cams for reciprocating said slides as the tool-holders rock, substantially as specified.

3. The combination, with a revolving chuck or can-holder, B B', of seaming-tools C D and double-seaming tool F F', reciprocating slides $c$, $d$, and $f$, upon which said tools are journaled, rocking tool-holders H and F², carrying said slides $c$, $d$, and $f$, and cams for reciprocating said slides as the tool-holders rock, mechanism, substantially as described, for rocking said tool-holder H, mechanism, substantially as described, for rocking said tool-holder F², and mechanism, substantially as described, for reciprocating said can-holder or chuck-disk B', substantially as specified.

4. The combination, with a revolving chuck or can-holder, B B', of seaming-tools C D and double-seaming tool F F', reciprocating slides $c$, $d$, and $f$, upon which said tools are journaled, rocking tool-holders H and F², carrying said slides $c$, $d$, and $f$, and adjustable slides or blocks K and F³, mounted on slideways on the frame of the machine and furnished with cams $c'$, $d'$, and $f'$ for operating said slides $c$, $d$, and $f$, substantially as described.

5. The combination, with a revolving chuck or can holder, of seaming-tools C and D, tool-slides $c$ and $d$, rocking tool-holder H, cam-block K, having cams $c'$ and $d'$, double tool F F', tool-slide $f$, rocking tool-holder F², and cam-block F³, having cam $f'$, substantially as specified.

6. The combination, with a revolving chuck or can-holder, of seaming-tools C and D, tool-slides $c$ and $d$, rocking tool-holder H, cam-block K, having cams $c'$ and $d'$, double tool F F', tool-slide $f$, rocking tool-holder F², cam-block F³, having cam $f'$, rock-shaft $f^2$, gear $f^3$, segment $f^4$, disk N, and connecting rod $n$, rock-shaft $h$, having arm $h'$, link $h^2$, cam-lever $h^3$, and cam G, substantially as specified.

7. The combination, with a revolving chuck or can-holder, of seaming-tools C and D, tool-slides $c$ and $d$, rocking tool-holder H, cam-block K, having cams $c'$ and $d'$, double tool F F', tool-slide $f$, rocking tool-holder F², cam-block F³, having cam $f'$, rock-shaft $f^2$, gear $f^3$, segment $f^4$, disk N, and connecting rod $n$, rock-shaft $h$, having arm $h'$, link $h^2$, disk G, cam-lever $h^3$, shafts G' N' P, and gears $p$, $p'$, $p^2$, $p^3$, and $p^4$, all combined and operating substantially as specified.

EDWIN NORTON.
JOHN G. HODGSON.

Witnesses:
EDMUND ADCOCK,
H. M. MUNDAY.